(12) United States Patent
Gaylord, Jr. et al.

(10) Patent No.: US 6,385,269 B1
(45) Date of Patent: May 7, 2002

(54) SPACER SPRING FORCE ADJUSTMENT TOOL AND METHOD OF ADJUSTING THE SPACER SPRING FORCE

(75) Inventors: William B. Gaylord, Jr.; William C. Peters, both of Wilmington; David G. Smith, Leland, all of NC (US)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 09/580,490

(22) Filed: May 30, 2000

(51) Int. Cl.[7] ............................................... G21C 19/06
(52) U.S. Cl. ........................ 376/260; 376/245; 376/438; 73/161
(58) Field of Search ............................. 73/161; 376/245, 376/260, 261, 263

(56) References Cited

U.S. PATENT DOCUMENTS 4,668,466 A * 5/1987 Rylatt .......................... 376/245
5,186,891 A * 2/1993 Johansson et al. ........... 376/438
5,215,705 A   6/1993 Butzin et al. ................ 376/247
5,490,418 A * 2/1996 Rebours et al. ............... 73/161

* cited by examiner

Primary Examiner—Michael J. Carone
Assistant Examiner—Daniel Matz
(74) Attorney, Agent, or Firm—Nixon & Vanderhye

(57) ABSTRACT

An adjustment tool is provided, having a probe, a head, an arm and a micrometer attached to the head. With the probe inserted into a spacer cell opening, the micrometer handle is rotated to a predetermined setting to pivot the arm. The opposite end of the arm from its engagement with the micrometer drive head engages and displaces the spring of the spacer cell to adjust its spring force. In one form, the arm is housed within the probe and the micrometer drive head displaces the distal end of the arm outwardly to correspondingly displace the spring outwardly, thereby decreasing the spring force. In another form of the spacer tool, the arm is spaced from the probe and has pivotal contact surfaces to straddle the spring. Movement of the drive head by rotating the micrometer handle to a predetermined setting causes the spring to be displaced inwardly of the spacer cell opening to increase the spacer spring force.

11 Claims, 2 Drawing Sheets

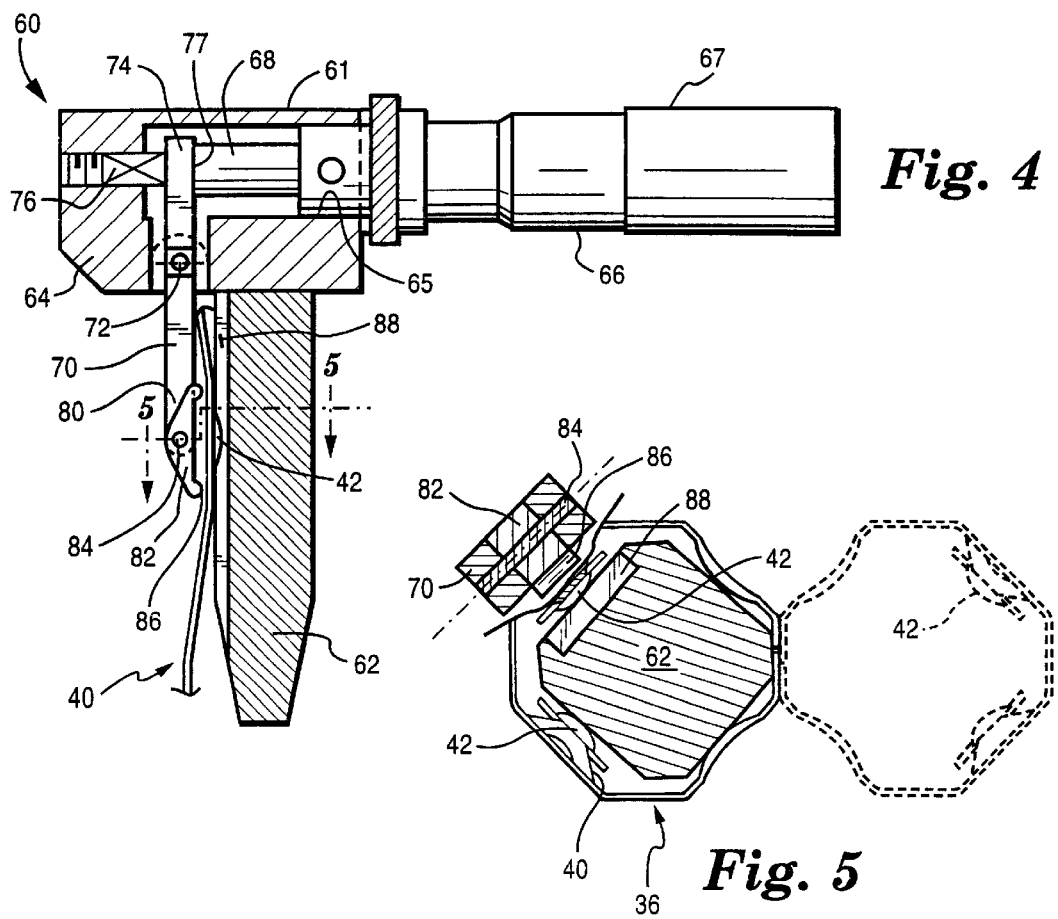
*Fig. 4*
*Fig. 5*
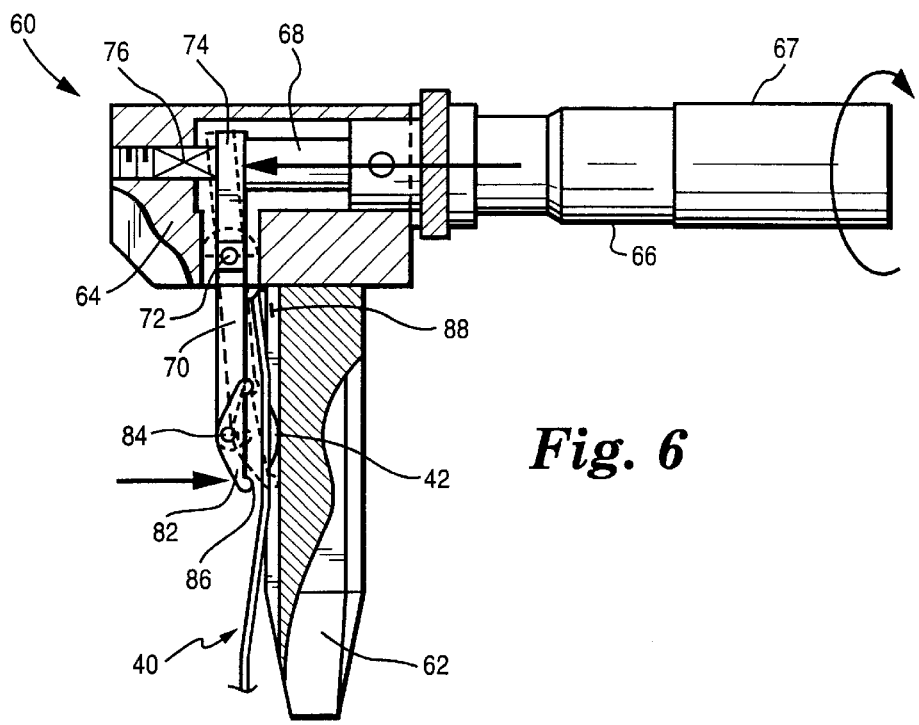
*Fig. 6*

SPACER SPRING FORCE ADJUSTMENT TOOL AND METHOD OF ADJUSTING THE SPACER SPRING FORCE

BACKGROUND OF THE INVENTION

The present invention generally relates to spacers for a nuclear fuel bundle and particularly relates to an adjustment tool and method of using the tool for adjusting the spring force of the spacer springs.

Nuclear fuel rod spacers for nuclear fuel rod assemblies are typically designed with spring mechanisms in the spacers that exert preload forces normal to each fuel rod in each fuel rod cell of the spacer. By preload forces is meant the forces applied in initially manufactured spacers before irradiation or other activities that would potentially stress the springs and result in a reduction of the spring forces. Typically, these preload forces are specified in the range of about one to three pounds for each spacer cell. A spring force outside of the specified range is grounds for rejection of the entire spacer. A known device, for example, see U.S. Pat. No. 5,215,705, can measure the spring force of the spacer spring. However, the device disclosed in that patent does not adjust the spring force of the spacer spring. Accordingly, there is a need for a tool for adjusting the spring force of spacer springs after initial manufacture of the spacer should the spring preload forces lie outside a predetermined range of preload forces.

BRIEF SUMMARY OF THE INVENTION

In accordance with a preferred embodiment of the present invention, there are provided a pair of adjustment tools for making calibrated adjustments in the spacer spring dimensions thereby to alter the spring forces in fabricated spacer assemblies. It is necessary to make adjustment to the spring forces in fabricated spacers in a manner that can be both calibrated and will not result in unacceptable damage to the spacers. Such tools must also meet standard requirements for nuclear fuel manufacturing including fabrication of the tools from nuclear grade materials and tools which will not damage the spacers or springs during insertion or removal nor contaminate the spacer with foreign materials or debris. Two distinct tools are provided for respectively displacing the spacer spring in an outward or an inward direction, depending upon the measured spring force. For displacing the spring in an outward direction to adjust the spring force, the tool includes a holder having a head, a probe depending from the head for insertion into the spacer opening and a lever pivoted to the holder. A micrometer is preferably secured to the head and has a displaceable drive head for engaging one end of the pivoted arm. By displacing the one end of the pivoted arm, the opposite end engages the spring and displaces the spring outwardly relative to the probe and spacer opening to adjust, i.e., decrease, the spring force.

Where the spring requires displacement inwardly toward the opening, the second tool includes a holder having a probe, a depending pivotal arm laterally outwardly of the probe and a micrometer attached to the head. The probe and pivotal arm are located in the spacer to straddle the spring. By displacing the drive head of the micrometer in engagement with one end of the pivoted arm, the opposite end of the pivoted arm engages the spring to displace the spring inwardly toward the probe thereby adjusting, i.e., increasing the spring force of the spacer spring in the cell receiving the probe. In both tools, the change in spring force is established by calibrating the micrometer setting against a resulting spring force for springs in test or calibration spacers, e.g., as measured by a spring force measurement tool such as described in the aforementioned U.S. Pat. No. 5,215,705. There is a linear relationship where the deformation constant is determined from empirical data collected by measuring the spring force before and after bending the spring with the tool hereof to various recorded set points. Once this constant has been determined the amount of deflection needed to alter the spring force to any given value can be readily determined using this equation. The deformation constant is given by the equation: $\Delta$ Spring Force=(Deformation Constant)($\Delta$ Spring Deflection).

In a preferred embodiment according to the present invention, there is provided apparatus for adjusting the spring force of springs of a spacer for a nuclear fuel bundle, comprising a tool including a tool holder probe for insertion into the opening of a spacer and a movable drive head and an arm carried by the tool and pivoted intermediate opposite ends thereof, the arm extending generally parallel to the probe and having a drive head engaging surface for pivoting the arm in response to movement of the tool drive head and a spacer spring engaging surface adjacent an opposite end thereof for displacing the spring thereby adjusting the spring force of the spring.

In a further preferred embodiment according to the present invention, there is provided a method of adjusting the spring force of a spring in a spacer cell opening of a spacer for a nuclear fuel bundle, comprising the steps of providing a holder having a probe and a displaceable arm, inserting the probe into the spacer opening and displacing the arm to displace the spring to thereby adjust the spring force of the spacer spring.

BRIEF DESCRIPTION OF THE DRAWINGS

FIG. 4 is a cross-sectional view of a further form of adjustment tool hereof;

FIG. 5 is a cross-sectional view thereof taken generally about on line 5—5 in FIG. 4 and illustrating portions of the tool disposed on opposite sides of a spacer spring; and FIG. 6 is a view similar to FIG. 4 illustrating the displacement of the spring in a direction inwardly of the spacer opening.

DETAILED DESCRIPTION OF THE INVENTION

Figure 1:
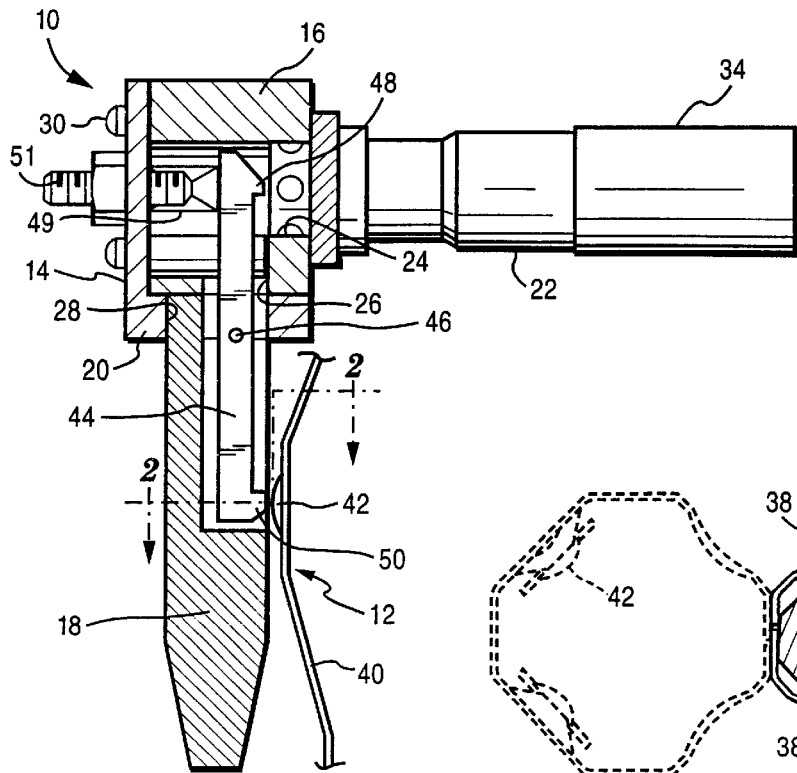
FIG. 1 is a side elevational view of an adjustment tool according to the present invention with a portion of the spacer spring being illustrated.

Referring now to FIG. 1, there is illustrated a form of an adjustment tool, generally designated 10, for adjusting the spring force of a spacer spring 12 by displacing the spring in an outward direction relative to the spacer opening in which the spring resides and in which opening a nuclear fuel rod, not shown, is located in use. The tool 10 includes a tool holder 14 having a tool head 16 and a probe 18. The holder 14 also includes a bracket 20 to which a micrometer 22 is secured.

The holder head 16 includes a lateral through opening 24 for receiving a head of micrometer 22 and an opening 26 normal thereto. The bracket 20 is a right angle bracket having a circular opening 28 in registration with opening 26.

Figure 3:
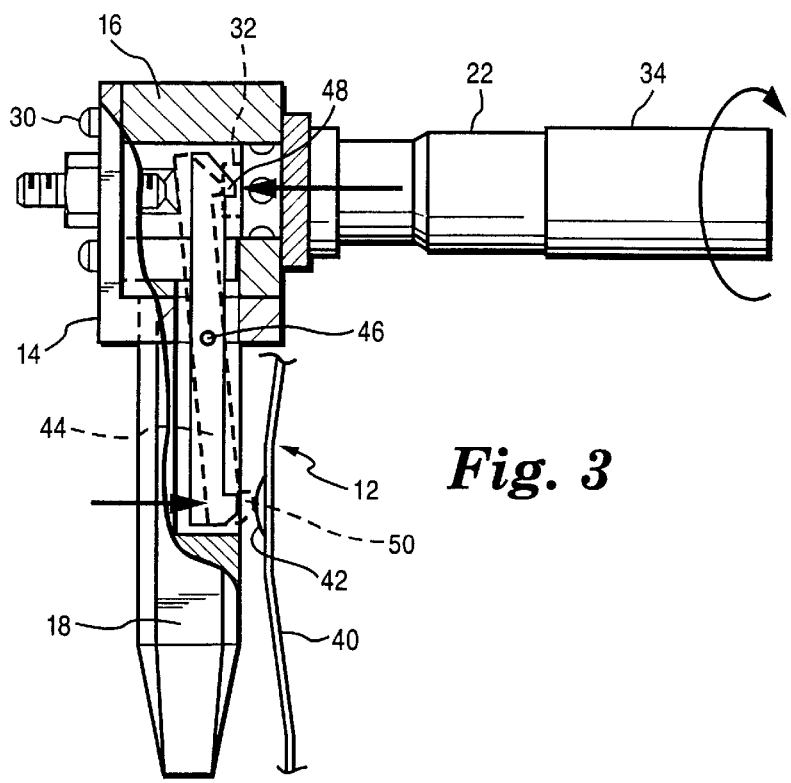
FIG. 3 is a view similar to FIG. 1 illustrating adjustment of the spring force of the spring by the tool.

The probe 18 is received through the circular opening 28. The holder head 16 is secured to the bracket 14 by screws 30. As illustrated in FIG. 3, the end of the micrometer 22 includes a displaceable drive head 32 which is displaceable in and out relative to the micrometer in response to rotary movement of the micrometer handle 34.

Figure 2:
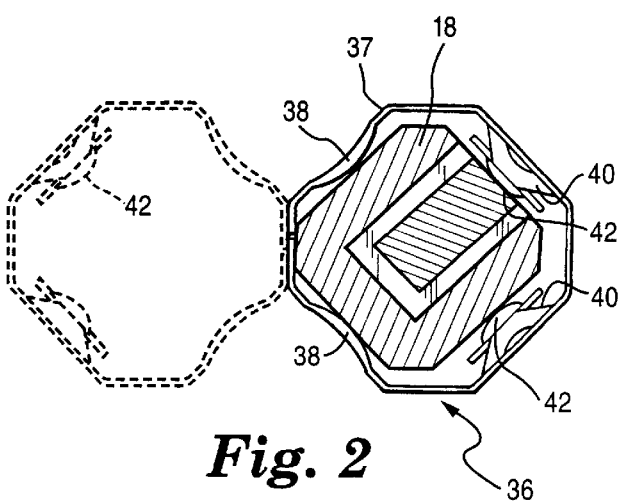
FIG. 2 is a cross-sectional view thereof taken generally about on line 2—2 in FIG. 1 and illustrating the tool disposed in a spacer opening.

Probe 18 has a cross-sectional configuration sized for reception within a spacer cell opening. A representative spacer cell 36 is illustrated in FIG. 2. It will be appreciated that the spacer cell comprises one of a plurality of spacer cells formed in a rectilinear array thereof, for example, a 9×9 or 10×10 array of cells for receiving nuclear fuel rods and forms part of a nuclear fuel bundle, not shown. A representative spacer disclosing an example of a typical spacer cell for use with the tool of the present invention is described and illustrated in U.S. Pat. No. 5,186,891, the disclosure of which is incorporate herein by reference. Each cell 36 comprises upper and lower bands, only the lower band 37 being illustrated, each band having a pair of stops 38 at right angularly related sides and a pair of inwardly directed springs 40 on opposite sides of the cell from the stops. Each spring 40 extends between the upper and lower bands, projects inwardly of the bands and has an intermediate dimple 42 for engagement with the fuel rod extending through the spacer cell. As illustrated in FIG. 2, the probe 18 is sized to engage the stops 38 and dimples 42 of the springs 40.

Referring back to FIG. 3, an arm 44 is pivotally mounted to the tool holder 14 for pivotal movement about an axis 46. The proximal or upper end of the arm 44 has a micrometer drive head engaging surface 48 for engagement with the micrometer head 32. On the opposite side of arm 44 from surface 48 there is provided a spring 49, the force of which is adjustable by a socket head cap screw 51. The distal end of the arm 44 includes a spring engaging surface 50 (FIG. 1).

To use tool 10, the probe 18 is inserted into the cell 36 to engage the spring stops 38 and springs 40. It will be appreciated that the probe 18 and arm 44 are dimensioned such that, upon insertion, the spring engaging surface 50 of arm 44 lies at an elevation for engagement with the dimple 42 of the spring 40. The micrometer 22 is previously calibrated to a micrometer setting which will obtain a desired spring force for the spring within the predetermined range of spring forces corresponding to the preload forces. After the probe 18 has been inserted and the surface 50 of arm 44 is aligned with the dimple 42 of the spring whose spring force is to be adjusted, the micrometer is set to the predetermined setting. This causes the micrometer drive head 32 to engage the drive head engaging surface 48 of arm 44, pivoting arm 44 about axis 46. This pivoting action, as illustrated in FIG. 3, causes the spacer spring engaging surface 50 to displace the spring in a direction outwardly of the spacer cell 36 thereby adjusting the spring force. Once the spring force has been adjusted, the micrometer is set back to an original setting and the tool is withdrawn for use in adjusting the second spring in the spacer cell as necessary or desirable. Spring 49 biases the upper end of the arm 44 into following engagement with the micrometer head. Screw 51 also limits the range of travel of arm 44 to prevent damage to spring 12. It will be appreciated that the foregoing causes a reduction in the force of spring 40 thereby lowering the force of the spring 40 on a fuel rod received on the cell when the fuel bundle is assembled.

Referring now to the embodiment hereof illustrated in FIGS. 4–6, a similar tool, generally designated 60, is provided. In this embodiment, however, the tool is configured to adjust, i.e., increase the spring force by adjusting or displacing the spring in a direction toward the spacer opening which receives the fuel rod. To accomplish this, the tool 60 includes a tool holder 61, probe 62, a tool head 64, a lateral opening 65, a micrometer 66 secured to the tool head 64, the micrometer having a micrometer drive head 68 extending through opening 65. An arm 70 is pivoted about a pin 72 secured to head 64, the proximal or upper end 74 of the arm being disposed between a spring 76 and the micrometer drive head 68 and having a drive head engaging surface 77. The lower or distal end 80 of the arm 70 carries a drive head comprised of a pivotal element 82 for pivotal movement about an axis 84. The pivotal element 82 is located relative to the head a distance such that the opposite ends of element 82, i.e., spring-engaging or contact surfaces 86, straddle the dimple 42 on the spring 40. The probe 62 also includes an elongated slot 88 extending its length lying opposite arm 70. Slot 88 has a width sufficient to receive the spring 40.

To use the tool 60 illustrated in FIGS. 4–6, the probe 62 is inserted into the spacer cell opening 36 with the arm 80 and element 82 extending along the outside of the spacer cell. That is, the probe 62 and the arm 80 and element 82 straddle the spring 40. When the prove is fully inserted, the pivotal element has opposite ends which straddle the dimple 42. As illustrated in FIG. 6, rotation of the micrometer handle 67 to the predetermined setting displaces the drive head 68 forwardly to pivot the arm 70, causing the element 82 to displace the spring 40 in a direction inwardly of the cell into spring slot 88. This displacement increases the spring force of the spring 40 on the fuel rod when the spacer is in assembly with the fuel bundle. After the spring force has been adjusted, the micrometer setting is returned to its original setting and the tool 60 is withdrawn from the spacer cell. The adjoining spring may likewise be adjusted as necessary or desirable. It will also be appreciated that one of the springs of the spacer cells may require an increase in spring force, while the adjacent spring may require a decrease in spring force. Thus, both tools may be used in a particular spacer cell.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for adjusting the spring force of springs of a spacer for a nuclear fuel bundle, comprising:

a tool including a tool holder probe for insertion into the opening of a spacer and a movable drive head; and an arm carried by said tool and pivoted intermediate opposite ends thereof, said arm extending generally parallel to said probe and having a drive head engaging surface for pivoting said arm in response to movement of the tool drive head and a spacer spring engaging surface adjacent an opposite end thereof for displacing the spring thereby adjusting the spring force of the spring;

said spacer spring engaging surface being mounted for movement in a direction toward said probe in response to movement of said tool drive head.

2. Apparatus according to claim 1 wherein said spacer spring engaging surface of said arm comprises an element pivoted on said opposite end of said arm and having a pair of spring contact surfaces.

3. Apparatus according to claim 1 wherein said arm is pivotally carried by said probe.

4. Apparatus according to claim 1 wherein said holder includes a head, said probe projecting from said holder head, said arm being pivotally carried by said head.

5. Apparatus according to claim 1 wherein said holder includes a head mounted adjacent a proximal end of said probe and having an opening, said tool including a micrometer carried by said head with said drive head extending into said opening, said holder head including a second opening for receiving a portion of said arm and enabling registration of said drive head and said drive head engaging surface within said holder head.

6. A method of adjusting the spring force of a spring in a spacer cell opening of a spacer for a nuclear fuel bundle, comprising the steps of:

provide a holder having a probe and a displaceable arm;

inserting the probe into the spacer opening; and displacing the arm to bend the spring sufficiently to alter the spring force of the spacer spring.

7. A method according to claim 6 wherein a micrometer is secured to the holder and including the step of displacing the arm a predetermined distance in accordance with a predetermined setting on the micrometer to provide a predetermined spring force to the spring.

8. A method according to claim 6 including displacing the arm such that a spring engaging surface thereof is displaced outwardly away from said probe.

9. A method of adjusting the spring force of a spring in a spacer cell opening of a spacer for a nuclear fuel bundle, comprising the steps of:

providing a holder having a probe and a displaceable arm;

inserting the probe into the spacer opening; and displacing the arm to displace the spring engaging portion thereof inwardly toward the probe to thereby adjust the spring force of the spacer spring.

10. A method according to claim 6 wherein a micrometer is secured to the holder and including the steps of displacing the arm a predetermined distance in accordance with a predetermined setting on the micrometer to provide a predetermined spring force to the spring and displacing the arm such that a spring engaging portion thereof is displaced outwardly away from said probe.

11. A method of adjusting the spring force of a spring in a spacer cell opening of a spacer for a nuclear fuel bundle, comprising the steps of:

providing a holder having a probe and a displaceable arm and a micrometer secured to the holder;

inserting the probe into the spacer opening;

displacing the arm to displace the spring engaging surface thereof inwardly toward the probe to thereby adjust the spring force of the spacer spring; and wherein the step of displacing includes displacing the arm a predetermined distance in accordance with a predetermined setting on the micrometer to provide a predetermined spring force to the spring.

* * * * *